RING COUNTER WITH NEON BULBS AND PHOTOCONDUCTIVE CELLS
Filed Oct. 22, 1965
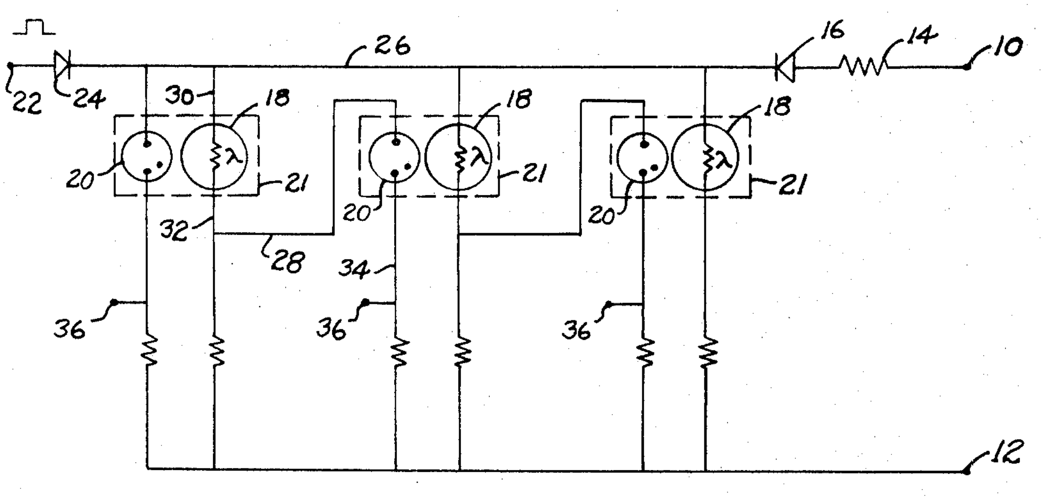
INVENTOR.
ATLEE S. HART
BY
TENNES I. ERSTAD
JOHN E. MC RAE

United States Patent Office 3,389,262

Patented June 18, 1968

3,389,262

RING COUNTER WITH NEON BULBS AND PHOTOCONDUCTIVE CELLS

Atlee S. Hart, Oak Park, Mich., assignor to American Standard Inc., a corporation of Delaware Filed Oct. 22, 1965, Ser. No. 502,047

3 Claims. (Cl. 250—209)

ABSTRACT OF THE DISCLOSURE

This invention proposes electric circuitry for counting electrical pulses, and applying said pulses to selected load devices in different output lines energized by the circuitry. The circuitry is characterized by glow lamps and photo-conductive cells arranged so that each cell energizes the next lamp; i.e., one lamp receives the first pulse to energize the first photo-conductive cell, and that cell in turn furnishes a path for the next pulse to energize the next lamp, and so on.

Novel features of the circuitry are the fact that the pulse supply line connects directly only with one of the power lines which provide the hold-on voltage for the lamps; this reduces the number of circuit connections as compared with arrangements wherein the pulse line connects directly with each lamp or cell.

*Background and summary*

This invention relates to electrical pulse counters which perform the function of devices known as shift registers or ring counters. The purpose of such devices is to produce one or more signal outputs after a predetermined number of sequentially applied input pulses.

Frequently the circuitry employed in such counters utilize vacuum tubes or solid state devices such as transistors or silicon controlled rectifiers. It is an object of the present invention to provide the function of ring counters at lower cost than previous devices. The invention utilizes neon glow lamps and photo-conductive cells to provide the pulse counting function.

In the drawing the single figure is a diagram of a circuit incorporating the invention. The circuit comprises a half wave power supply which includes terminals 10 and 12, resistance 14, and rectifying diode 16. Connected with the power supply are a series of cadmium sulphide photo-conductive cells 18 and neon glow lamps 20. Each glow lamp and its adjacent photo-conductive cell 18 are preferably housed within a light-impervious enclosure 21 so that the light output from each lamp is effective to place the adjacent cell 18 in the conducting mode.

The positive potential developed at source terminal 10 is chosen to be less than that required to energize each lamp 20 but greater than that required to maintain the lamp fired. To fire each lamp 20 there is provided a source of voltage pulses, herein shown as a terminal 22 and rectifying diode 24. During the periods when the pulse voltage is superimposed on the supply voltage from terminal 10 the total potential at supply line 26 is greater than that required to fire each lamp 20. Each voltage pulse is chosen to have a duration long enough to fire one lamp but insufficient to fire a succeeding lamp.

As the first voltage pulse is applied to terminal 22 the resultant increase potential at line 26 is effective to fire the leftmost lamp 20. The light output from this lamp places the leftmost cell 18 in the conducting mode. The pulse at terminal 22 terminates before the firing potential can be applied through line 28 to the center lamp 20.

After termination of the first voltage pulse the leftmost lamp 20 is maintained in a fired condition by the terminal 10 voltage. The leftmost cell 18 thus continues to be in the conducting mode. When the next voltage pulse is applied to terminal 22 the center lamp 20 is fired through a circuit which comprises line 30, cell 18, lines 32 and 28, the lamp, and line 34. The pulse endures long enough for the center cell 18 to be made conductive, but not long enough for it to effectively transmit the pulse voltage to the right lamp 20.

It will be seen that each pulse at terminal 22 is effective to energize but one glow lamp 20. Thus, the pulses may be counted by connecting selected ones of the lamps to suitable output circuits, as by means of terminals 36.

The illustrated circuit depends for operability on the pulse at terminal 22 enduring for less time than the firing time for two lamps plus the response time for one cell 18. The lamp firing time of a conventional neon lamp is generally much less than the response time of a cooperating photocell. For example, assuming a voltage pulse sufficiently above firing level, the lamp might fire in about three hundred microseconds while the photoconductive cell might become conductive in about three milliseconds. The voltage pulse at terminal 22 would under these circumstances have to endure for a period greater than three hundred microseconds but less than 3.6 milliseconds.

The firing time for a glow lamp is influenced to some extent by the presence of ambient light. Thus, when the lamp is in a totally darkened atmosphere the firing time is erratic and generally longer than when some ambient light is present. Therefore each enclosure 21 may advantageously be supplied with a pin hole for admitting a slight quantity of ambient light to the lamp.

What is claimed is as follows:

1. Pulse counting circuitry comprising a series of glow lamps; a photo-conductive cell physically associated with each lamp to receive light rays therefrom; a voltage source comprising two power lines; parallel branch lines connecting the individual cells across the power lines; said voltage source providing a potential which is less than that required to fire each lamp but more than that required to maintain the lamp fired; pulse means connected directly to one of the power lines for superimposing additional voltage pulses on the lamp-maintaining potential so that during the pulse periods the total voltage across the two power lines is greater than the firing voltage for each lamp; means connecting a first one of the lamps across the power lines, whereby said first lamp may be energized to place the associated cell in a conducting mode; and individual circuit lines connecting said one power line to each other lamp, each respective preceding cell, and the other power line, whereby one pulse will energize a lamp which will then energize its associated cell, and the next pulse will energize the next lamp through the energized cell.

2. The circuitry of claim 1 and further comprising means shielding each cell from light extraneous of its associated lamp.

3. The circuitry of claim 1 wherein each pulse endures for a period long enough to fire one glow lamp but not long enough for the associated photo-conductive cell to energize the succeeding lamp.

References Cited

UNITED STATES PATENTS

| | | | |
|---|---|---|---|
| 3,175,090 | 3/1965 | Reis et al. | 250—209 |
| 3,320,472 | 5/1967 | Tibbetts | 250—209 |

RALPH G. NILSON, *Primary Examiner.*

M. ABRAMSON, *Assistant Examiner.*